2 Sheets--Sheet 1

O. ZWIETUSCH.

Carbonic-Acid Gas Generator.

No. 6,287. Reissued Feb. 9, 1875.

Witnesses.

Miles H. Moxon

J. B. Townsend

Inventor.

Otto Zwietusch per Attys. A.H. Evans & Co.

THE GRAPHIC CO. PHOTO-LITH. 39 & 41 PARK PLACE, N.Y.

2 Sheets--Sheet .2

O. ZWIETUSCH.

Carbonic-Acid Gas Generator.

No. 6,287. Reissued Feb. 9, 1875.

Witnesses.

Chas H Moxon

F B. Townsend

Inventor.

Otto Zwietusch per Attys A. H. Evans & Co

THE GRAPHIC CO. PHOTO-LITH. 39 & 41 PARK PLACE, N.Y.

UNITED STATES PATENT OFFICE.

OTTO ZWIETUSCH, OF MILWAUKEE, WISCONSIN.

IMPROVEMENT IN CARBONIC-ACID-GAS GENERATORS.

Specification forming part of Letters Patent No. 145,774, dated December 23, 1873; reissue No 6,287, dated February 9, 1875; application filed December 9, 1874.

*To all whom it may concern:*

Be it known that I, OTTO ZWIETUSCH, of Milwaukee, in the county of Milwaukee, in the State of Wisconsin, have invented certain Improvements in Carbonic-Acid-Gas Generators, of which the following is a specification:

My invention has for its object the manufacture of carbonic-acid gas, to be supplied to suitable articles, such as kegs or barrels filled with beer or other liquids, and kept on tap, to supply the place of the liquid drawn, and to keep the balance in the receptacle perfectly pure and free from adulteration by the contact of air; and the machine is arranged so as to be self-acting, and operate without any trouble or looking after when once charged and put in operation.

Figure 1:
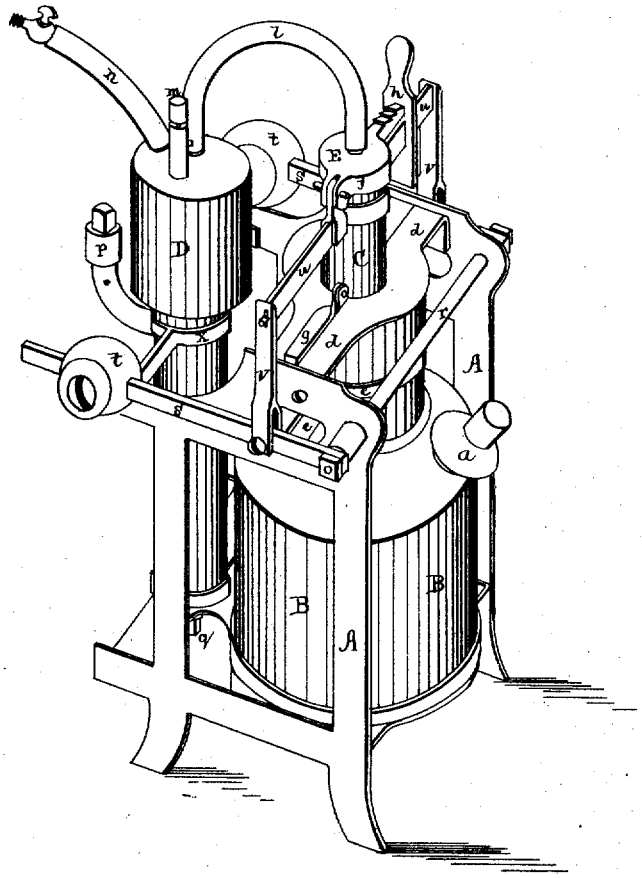
Figure 2:
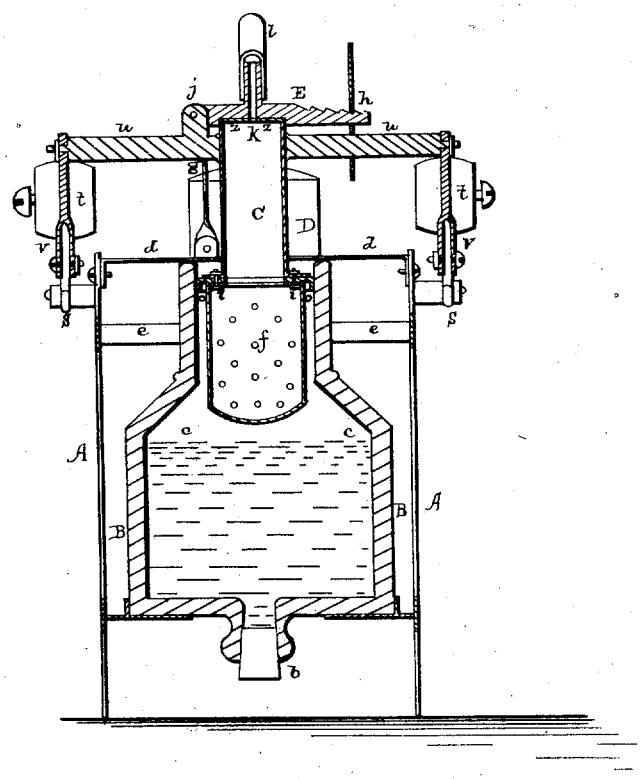

Figure 1, Sheet 1, is a perspective view of my invention; and Fig. 2, Sheet 2, a vertical sectional view.

A is the frame of the machine; B, a jar, made of suitable material, in which the carbonic-acid gas is manufactured; C, piston and piston-pipe, made hollow, (the lower part of the pipe is made a little the largest,) through which marble is conveyed to the basket or holder, which is attached to its bottom; D, a washer, in which the gas is washed; E, cover for the piston-pipe opening; *a*, inlet to the jar, through which the acid is introduced; *b*, outlet, by which the jar is emptied; *c c*, space in the jar for the gas when generated above the acid; *d d*, cover of jar B; *e e*, brace across the frame A, inclosing the top of jar B; *f*, basket or holder for marble, hung to the bottom of piston C; *g*, a stop or latch to hold the piston up and keep the marble out of the acid; *h*, clamp to the cover E on the top of the piston; *i i*, bolts, which fasten the basket *f* and packing to the piston; *j*, hinge to cover E; *k*, opening in the cover E to let the gas pass from the hollow piston C to the washer D through pipe *l*; *m*, safety-valve on the top of washer D; *n*, outlet-pipe to convey the gas to the vessel when wanted; *o o*, piston-packing, made of one or more pieces, fastened to the piston C at the inner edge, and the outer edge turned down into the jar, so that as the gas presses upward it forces the packing against the neck of the jar and makes a self-acting packing, a tight joint; *p*, inlet into washer D to fill in water; *q*, outlet to washer, through which to draw off the water; *r*, cross-bar, forming a fulcrum for levers *s s*; *t t*, weights on the ends of levers *s s*, with which to regulate the pressure of the gas; *u u*, cross-bar attached to the head of piston C; *v v*, forked connections, which connect levers *s s* to cross-bar *u u*; *z z*, packing.

The operation of this machine is as follows: Raise the piston C and stand up the stop *g* under the bar *u u*; fill the acid into jar B, through inlet *a*, up to the letters *e e*; then open cover E by sliding clamp *h* off the bar connected with the cover, and fill up the basket and piston with pieces of marble, and then close the cover again; then fill the washer D with water or any suitable chemical solution, and close all the cocks; remove the stop *g* from its upright position, and the basket which holds the marble will settle down into the acid, and the action of the acid on the marble will generate gas, which will pass through piston C and through the small opening *k* into the washer D, where it will be purified and escape through outlet *n* to wherever it is wanted. The pressure is regulated by the weights *t t* on the levers *s s*, which press the piston and basket down, so that the basket enters the acid; and as the gas is generated, it accumulates force, and, pressing against the packing *o o*, raises the basket out of the acid; and as the gas is used out, the pressure becomes less, and the basket is pressed down by the weights, and thus it works without interruption as long as there is any strength in marble and acid self-acting.

It will be perceived from the above description of the operation of my invention that the gas passes up through the piston C before reaching the pipe *l*, which leads to the washer. The purpose of this arrangement is obvious. The acid, when coming in contact with the marble and liberating gas, also forms a froth or foam, which, as it rises, could easily pass over into the washer if the leading pipe *l* had its connection near the acid or acid-chamber. The rapid rising of the foam or froth has a strong tendency to carry up particles of the broken marble, which, if allowed to pass on toward the washer, would be likely to stop up the pipes and arrest the escape of the gas;

and this, in turn, would cause a bursting of the apparatus, to the great danger to life and property. Hence, I cause the gas to pass up through the body of the marble, and thus drain off all particles of matter likely to interfere with the free working of the machine. This arrangement I deem of vital importance.

Having thus described my invention, what I claim as new, and desire to secure by Letters Patent, is—

1. Generating-jar B, having a narrow cylinder extending at the top, with an inlet at the side and an outlet at the bottom, as specified.

2. A carbonic-acid-gas generator, from which the gas passes off through a piston, substantially as described.

3. Generator B, in combination with the basket *f*, piston C, packing *o o*, packing *z z*, cover E, clevis *h*, cross-bar *u*, and levers *s s*, weights *t t*, and connections *v v*, substantially as described.

4. Cross-bar *e*, cover *d*, and generator B, all in combination with latch *g*, substantially as described.

5. The combination of safety-valve *m*, washer D, and generator B, substantially as set forth.

6. A self-regulating carbonic-acid-gas generator, constructed with a piston and with a basket or bag attached thereto, whereby the alkali is raised out of the acid by means of the piston, substantially as set forth.

OTTO ZWIETUSCH.

Witnesses:
JOHN G. HIRSCH,
EDWARD E. BORGNIS.